United States Patent
Hitchon (10) Patent No.: US 6,817,420 B2
(45) Date of Patent: Nov. 16, 2004

(54) POTABLE WELL CONVERSION DEVICE

(76) Inventor: Stewart Hitchon, RR #5, Belleville, Ontario (CA), K8N 4Z5

(*) Notice: Subject to any disclaimer, the term of this patent is extended or adjusted under 35 U.S.C. 154(b) by 0 days.

(21) Appl. No.: 10/218,088

(22) Filed: Aug. 14, 2002

(65) Prior Publication Data

US 2003/0051882 A1 Mar. 20, 2003

Related U.S. Application Data

(60) Provisional application No. 60/312,470, filed on Aug. 16, 2001.

(30) Foreign Application Priority Data

Aug. 15, 2001  (CA) ............................................. 2355157

(51) Int. Cl.[7] .............................................. E21B 43/00
(52) U.S. Cl. ........................ 166/378; 166/67; 166/76.1; 285/302
(58) Field of Search ................................ 166/378, 379, 166/380, 67, 69, 76.1, 77.51, 85.2; 285/302, 351

(56) References Cited

U.S. PATENT DOCUMENTS

| | | | |
|---|---|---|---|
| 1,933,117 A | 8/1933 | Markle | |
| 2,475,635 A | 7/1949 | Parsons | |
| 2,488,470 A | 11/1949 | Gerweck et al. | |
| 2,900,028 A | 7/1959 | Hanes | |
| 3,486,774 A | 12/1969 | Corey | |
| 3,519,073 A | 7/1970 | Shelter | |
| 3,625,281 A | * 12/1971 | Herd et al. ................. | 166/344 |
| 3,713,675 A | 1/1973 | White | |
| 3,998,245 A | 12/1976 | Martin | |
| 4,073,511 A | 2/1978 | Haas et al. | |
| 4,270,775 A | 6/1981 | Noensie et al. | |
| 4,531,664 A | * 7/1985 | Baski ......................... | 228/125 |
| 4,607,664 A | 8/1986 | Carney et al. | |
| 4,858,964 A | 8/1989 | Usui | |
| 5,323,854 A | 6/1994 | Pursley | |
| 5,396,950 A | 3/1995 | Talley et al. | |
| 5,752,814 A | * 5/1998 | Starks et al. ................. | 417/554 |
| 5,829,524 A | * 11/1998 | Flanders et al. ............ | 166/277 |
| 6,112,545 A | * 9/2000 | Stethem ....................... | 62/434 |
| 6,626,244 B2 | * 9/2003 | Powers ....................... | 166/373 |

FOREIGN PATENT DOCUMENTS

WO        WO011312 A1    3/2000

\* cited by examiner

Primary Examiner—Frank Tsay
(74) Attorney, Agent, or Firm—Katten Muchin Zavis Rosenman (57) ABSTRACT

Disclosed herein is a coupling device for converting a below-ground potable water well installation to an above-ground installation, the device comprising a housing having a first opening which is dimensioned to receive an upper end of a below-ground well casing and a second opening which is dimensioned to receive a lower end of a well casing extension; gasket means located adjacent the first and second openings for sealing the respective connections between the housing, the below-ground well casing and the well casing extension, the gasket means further providing a first seating surface to seat the upper end of the well casing and a second seating surface to seat the lower end of the well casing extension; and a central region including a passage to receive a well line adaptor there between.

34 Claims, 6 Drawing Sheets

POTABLE WELL CONVERSION DEVICE

REFERENCE TO CO-PENDING APPLICATIONS

The entire subject matter of U.S. Provisional application Ser. No. 60/312,470 filed Aug. 16, 2001 and entitled POTABLE WELL CONVERSION DEVICE is incorporated by reference. The applicant claims priority benefit under Title 35, United States Code, Section 119(e) of U.S. Provisional application Ser. No. 60/312,470 filed Aug. 16, 2001 and entitled POTABLE WELL CONVERSION DEVICE and, under Title 35, United States Code, Section 119, of Canadian Patent Application Ser. number 2,355,157 filed Aug. 15, 2001 and entitled POTABLE WELL CONVERSION DEVICE.

BACKGROUND OF THE INVENTION

1. Field of the Invention

The present invention relates to upgrading potable water wells and more particularly to converting 'below-ground' pump installations to 'above-ground' installations.

2. Description of the Related Art

Potable water wells have become the focus of the public's attention in Canada over the past year as a result of the tragedy in Walkerton, Ontario in the spring of 2000. The Provincial Government of Ontario has regulations to ensure the public has access to clean drinking water. There have been similar events over the past several years which have made this an important public policy issue across North America.

Clean drinking water comes from a number of sources, including drilled wells. For many years, the drilled well has been installed "below-ground". Not to be confused with the below ground source of water itself, the term "below-ground" herein below is intended to refer to those installations where the well casing has an upper end which itself is below the ground surface, for example four to six feet below the ground surface. The well casing is usually located in a well chamber which can be, for example, a cement casing or a corrugated steel casing, either of a size sufficient to allow a well installer to join the pump line to a water supply line above the surface of the well casing but which is below the surface of the ground. This below-ground configuration is commonly used in northern climates where pump lines are located a sufficient depth below the ground surface to protect them from freezing.

Though sufficient under earlier regulations, this below ground installation arrangement has not met government regulations for some time. It is common to adapt these below ground well installations to an "above-ground" version, using a generally unsatisfactory technique. It requires that an installer climb down into the typically cramped well chamber and first disassemble the well pump line from the water supply line. The installer must then weld a well casing extension onto the upper exposed end of the well casing with an arc welder. The well casing upper end is often rough or poorly cut to begin with, often requiring a grinding step. It is difficult, if not impossible, to form a tight joint between the well casing upper end and the well casing extension. This increases the risk that the weld seam is not water tight and raises the risk that ground water outside the well casing may enter through the seam causing contamination.

A hole is then formed in the welded casing to accommodate a "pitless" adaptor. The pitless adaptor is a commonly used pump line adaptor that is commercially available through Canadian Plumbing and Pump dealers. Often, the pitless adaptor hole is simply cut with a cutting torch, similarly making it different form a tight seal, thereby presenting a similar risk of unwanted exterior ground water through the poor seal into the well casing.

Furthermore, the welding operation is very dangerous. The installer is usually squeezed into the cramped space with an arc welder. The well chamber is either damp or wet, significantly increasing the risk if electrocution. The welding operation can therefore involve extended periods in a confined space with relatively poor air quality. Once this relatively difficult and dangerous procedure is completed, the well chamber is then filled in and the above-ground exposed end of the well casing extension is capped in a normal fashion.

Consequently, there remains the need for an improved method for converting "below-ground" well installations to "above-ground" installations. It is an object of the present invention to provide a novel method for doing so.

SUMMARY OF THE INVENTION

In one of its aspects, the present invention provides a coupling device for converting a below-ground potable water well installation to an above-ground installation, the device comprising;

a housing having a first end region to engage an upper end of a below-ground well casing and a second end region to engage a lower end of a well casing extension;

gasket means located adjacent the first and second openings for sealing the respective connections between the housing, the below-ground well casing and the well casing extension; and a central region including a passage to receive a well line adaptor there between.

Preferably, the gasket means further comprising a first seating surface to seat the upper end of the well casing and a second seating surface to seat the lower end of the well casing extension In one embodiment, the first end region includes a first opening which is dimensioned to receive the upper end of the below-ground well casing and the second end region has an opening which is dimensioned to receive the lower end of the well casing extension.

In another embodiment, the first end region is arranged to extend into the upper end of the below-ground well casing and the second end region has an opening which is dimensioned to receive the lower end of the well casing extension.

In still another embodiment, the first and second end regions are arranged to extend into both the upper end of the below-ground well casing and the lower end of the well casing extension.

In one embodiment, the passage is between the first and second seating surfaces.

Preferably, the gasket means includes a passage which is aligned with the passage in the housing to receive the well line adaptor. The gasket means includes a gasket sleeve which extends from a region near the first end to a region near the second end. The gasket sleeve may or may not be a one piece member.

Preferably, the housing includes a gasket receiving region and a plurality of locating formations to locate the gasket sleeve therein. More preferably, the housing includes a gasket receiving chamber of an increased diameter relative to the diameters of the first and second openings.

In one embodiment, the housing is formed from a one piece member which has an expanded central portion with a diameter sufficient to accommodate the lower and upper ends together with the gasket member there between. The upper and lower regions also include annular surfaces which are separated by a distance sufficient for the gasket sleeve to fit there between.

The gasket, in the preferred embodiment, further includes a first inner surface region which is radially inwardly tapered from first the opening toward the first seating surface and a second inner surface region which is radially inwardly tapered from the second opening toward the second seating surface and a pair cylindrical seating regions, each of which neighbouring a corresponding seating surface.

In another aspect of the present invention, there is provided a method for converting a below-ground potable water well installation to an above-ground installation, the below-ground installation being of the type having a well casing with an upper end positioned below the ground surface and located within a well chamber, comprising the steps of:

a) accessing the well chamber and opening the upper end of the well casing;

b) accessing a well pump line in the well casing which is connected, by a fluid joint, with a water supply line extending into the pump chamber and joined with the well chamber from a neighbouring water delivery location;

c) disconnecting the joint and isolating the well pump line;

d) providing a coupling member, having:
    a housing having a first opening to receive the upper end and a second opening to receive a lower end of a well casing extension;
    a gasket arrangement for sealing the connection between the housing and the upper end and the connection between the housing and the lower end;
    a first seating surface to seat the upper end and a second seating surface to seat the lower end; and a passage to receive a well line adaptor there between, the seating surfaces between separated by a predetermined spacing;

e) preparing the upper end for engagement with the coupling member;

f) orienting the first opening of the coupling member to a position adjacent the upper end and positioning the housing on the upper end to bring the upper end against the first seating surface;

g) installing a pump line adaptor through a passage formed in the coupling member;

h) installing the water supply line to the pump line adaptor;

i) selecting a well casing extension member of a length which, when added to the predetermined spacing between the seating surfaces in the coupling member, will extend above the ground surface;

j) orienting the lower end of the well casing extension adjacent the second opening and positioning the lower end in the second opening to bring the lower end against the second seating surface;

k) filling the well chamber with a suitable filling material around the coupling and the well casing extension member; and l) installing the well pump line to the well pipe adaptor.

Preferably, step c) includes the step of pulling the well pump line and the pump from the well casing.

In yet another aspect of the present invention, there is provided a potable water well installation, comprising a below-ground well casing member, an above-ground well casing extension member and a well pipe extension coupler joining them, the coupler having a pair of opposed openings to receive respective adjacent ends of the well casing and well casing extension members, the coupler further comprising a passage and a well pipe adaptor extending through the passage, the adaptor having an upstream end in fluid communication with a down well pump and a downstream end in fluid communication with a water supply pipe.

In yet another aspect of the present invention, there is provided a coupling device for converting a below-ground potable water well installation to an above-ground installation, the device comprising a housing having a pair of openings, one to receive a below-ground well casing and another to receive a lower end of a well casing extension; the housing having an outer wall with an expanded central region to provide the central region with a diameter which is larger than the diameters of each of said openings, the central region being bordered by a pair of annular abutments between which is located a one piece gasket sleeve, the gasket sleeve having an inner passage which is coaxial with the pair of openings and which is arranged to seal each end of the well casing end with the well casing extension, the inner passage of gasket sleeve having a pair of annular seating surfaces to locate each of the two ends in their fully engaged positions within the gasket sleeve, the annular seating surfaces being separated by a central region, a passage through the gasket in the central region and the outer wall of the housing to receive a well pipe connection adaptor therein, the inner passage having pair of tapered portions, each of which is tapered inwardly from each opening toward each seating surfaces and a pair of second non-tapered portions, each of the second non-tapered portions being located between a first portion and a seating surface.

In still another aspect of the present invention, there is provided a method of converting a below-ground potable water well installation to an above-ground installation, the method comprising;

a step for providing housing having a first opening which is dimensioned to receive an upper end of a below-ground well casing and a second opening which is dimensioned to receive a lower end of a well casing extension;

a step for installing a gasket adjacent the first and second openings for sealing the respective connections between the housing, the below-ground well casing and the well casing extension, so that the gasket has a first seating surface to seat the upper end of the well casing and a second seating surface to seat the lower end of the well casing extension;

a step for providing the gasket with a central region containing a passage to receive a well line adaptor there between;

a step for positioning the first opening on the upper end;

a step for locating the lower end of extension member in the second end;

a step for bringing the upper end and the coupling member, and the lower end and the coupling member into a sealed engagement; and a step for installing the well line adaptor.

In yet another of its aspects, there is provided a method of converting a below-ground water well installation to an above-ground installation, the below-ground installation being of the type having a well casing with an upper end positioned below the ground surface and located within a well chamber, comprising the steps of;

exposing the upper end of the well casing;

isolating a pump conduit from the well casing;

locating a well casing extension;

providing a housing having a first end region which is arranged to engage an upper end of the well casing and a second opening which is arranged to engage the well casing extension, and one or more sealing members for sealing the respective connections between the housing, the below-ground well casing and the well casing extension; and a central region including a passage to receive a well line adaptor there between, and;

joining the upper end of the well casing and the well casing extension with the housing.

BRIEF DESCRIPTION OF THE DRAWINGS

Several preferred embodiments of the present invention will be provided, by way of example only, with reference to the appended drawings, wherein.

DESCRIPTION OF THE PREFERRED EMBODIMENTS

Figure 1:
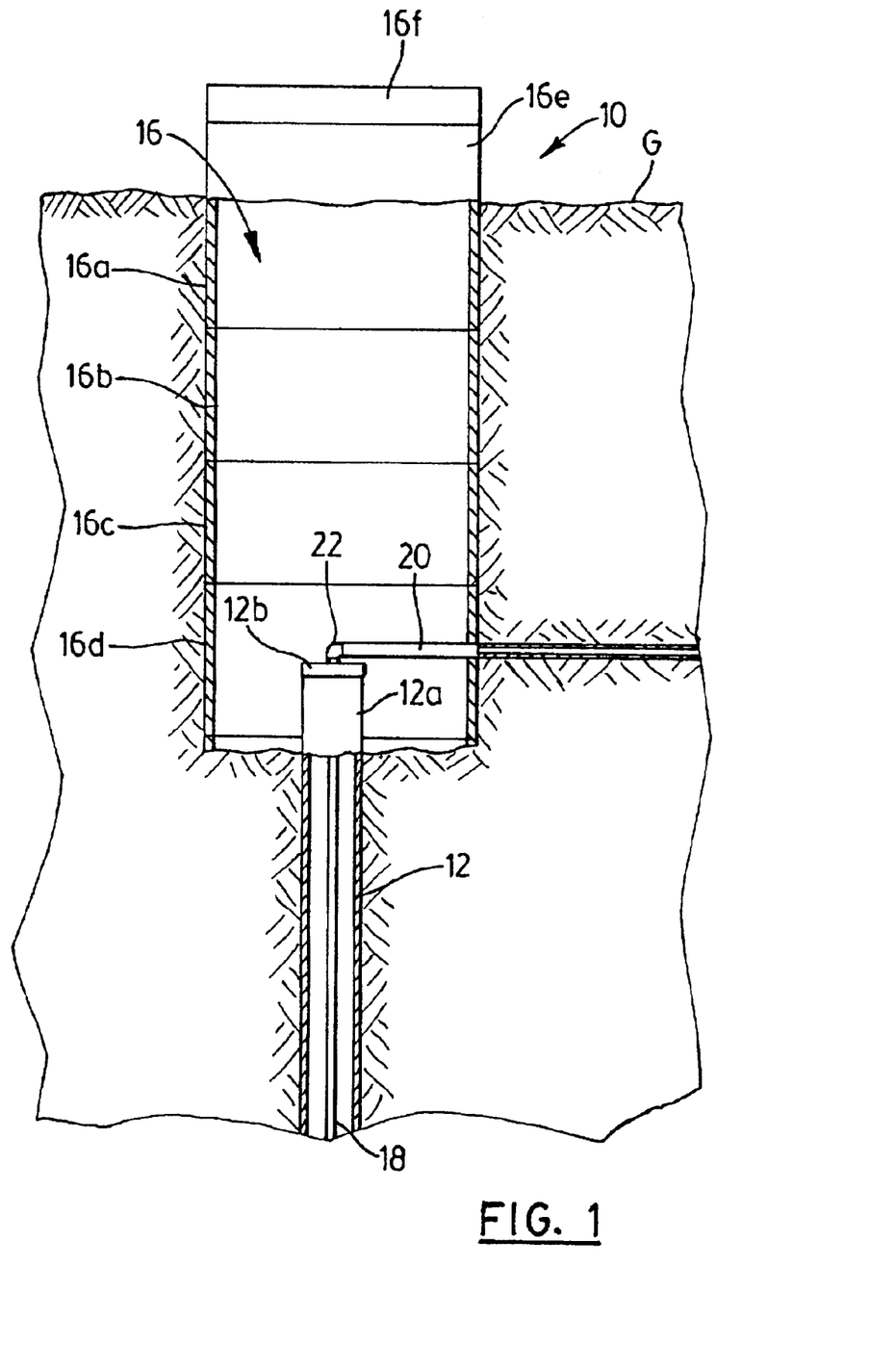
FIG. 1 is a sectional view of a potable water well installation.

A conventional potable water well installation is shown at 10 in FIG. 1. It has a well casing 12 with an upper end 12a which is below the level of the ground surface shown at G. Therefore, this will be referred to as a "below-ground" well installation. The upper end 12a is positioned in a well chamber 16 which is provided by a number of concentrically aligned well chamber forms 16a–16e. The form 16e is positioned above the ground surface and has a cap 16f installed on its upper annular edge to close the well chamber 16.

Referring once again to the well casing 12, its upper end 12a is sealed with a cap 12b. A passage is provided through the cap to accommodate the upper end of a well pump line 18 which is joined to a water supply line 20 at a joint 22.

Figure 2:
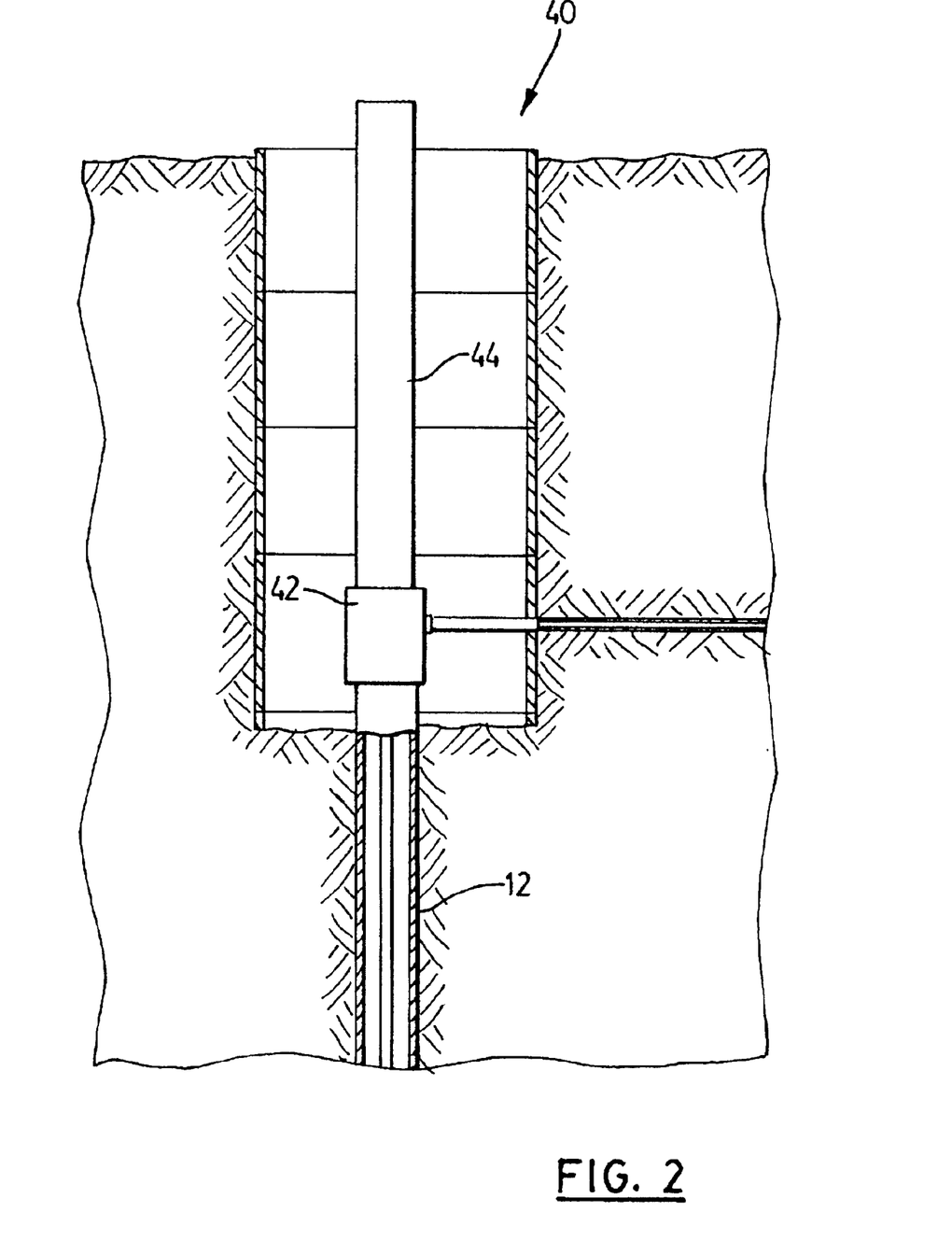
FIG. 2 is a sectional view of another, partially completed, potable water well installation.
Figure 3:
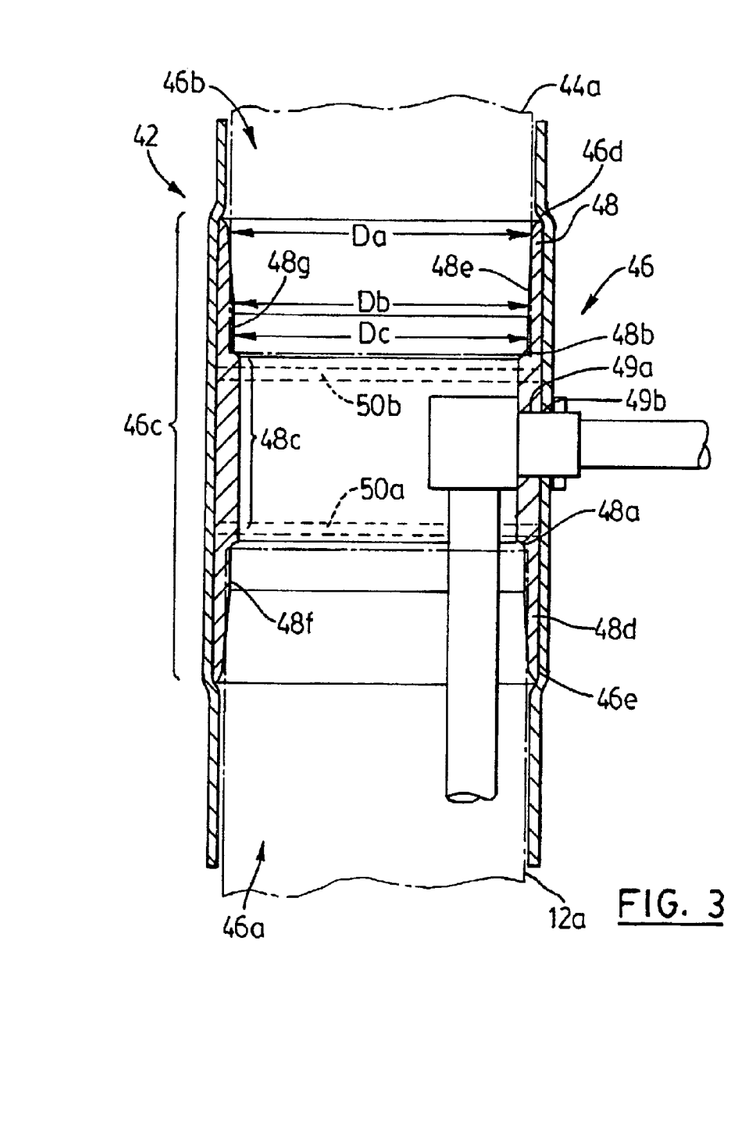
FIG. 3 is a sectional view of a portion of the installation of FIG. 2.
Figure 4:
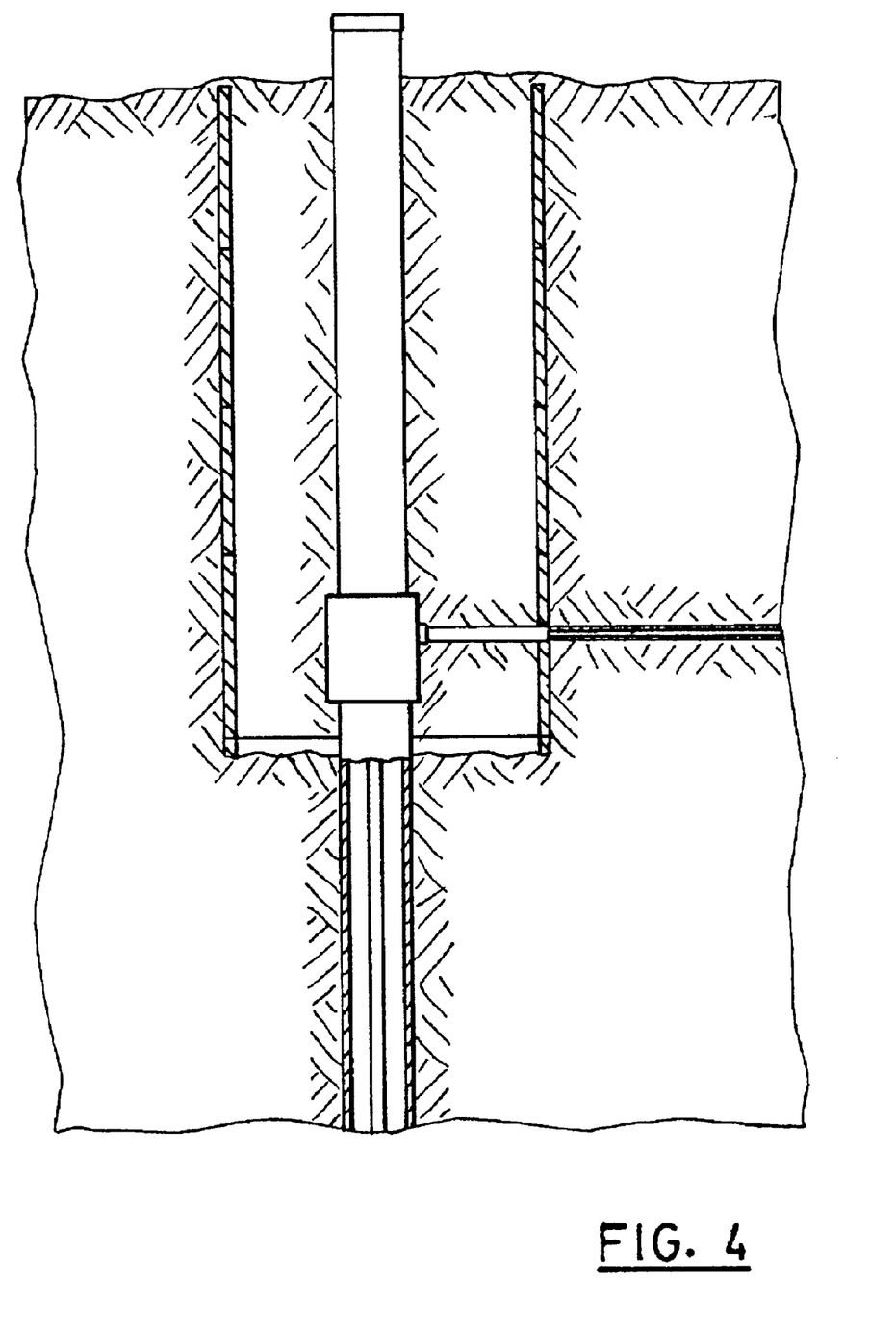
FIG. 4 is a sectional view of the potable water well installation of FIG. 2, as completed.

FIG. 2 illustrates a partially completed conversion of the well installation 10 to an "above-ground" installation as now shown at 40, while FIG. 4 illustrates the same well installation 40 in its substantially completed state. The above-ground well installation 40 has a coupling member 42 which joins the well casing 12 with a lower end 44a of a well casing extension 44, the latter of which has a length sufficient to extend above the ground surface, thus referred to as an above-ground well installation. Details of the interconnection of the well casing, the coupling member and the well casing extension are illustrated in FIG. 3.

The coupling device has a housing 46 having a first opening 46a which is dimensioned to receive the upper end 12a of the well casing and a second opening 46b which is dimensioned to receive the lower end 44a of the well casing extension.

A gasket means, for example a gasket sleeve 48, is located adjacent the first and second openings for sealing the respective connections between the housing 44, the below-ground well casing 12 and the well casing extension 44. The gasket sleeve further provides a first seating surface 48a to seat the exposed well casing end 12a and a second seating surface 48b to seat the lower end 44a of the well casing extension. Separating the seating surfaces is a central region 48c which also includes a passage 49a which is aligned with a passage 49b in the housing 46, to receive a well line adaptor there between, such as a pitless adaptor.

The gasket sleeve may or may not be a one piece member and may be formed from a variety of suitable materials including natural or synthetic rubbers or synthetic resilient polymer materials, for example. The housing includes a gasket receiving chamber 46c which has an increased diameter relative to the diameters of the first and second openings 46a and 46b.

In this embodiment, the housing 46 is formed from a one piece member which has an expanded central portion to form the gasket receiving chamber 46c, with a diameter sufficient to accommodate the well casing end and the well casing extension end together with the gasket member there between. The housing has formations to locate the gasket and, in this instance, are provided by annular surfaces 46d, 46e which are separated by a distance sufficient for the gasket sleeve to fit there between.

The gasket is dimensioned so that it fits snugly within the gasket receiving region, that is bounded by the annular surfaces 46d, 46e. This will aid the retaining of the gasket in position within the housing, as the coupling device is installed, as described herein below.

The gasket, in the preferred embodiment, further includes a first inner surface region 48d which is radially inwardly tapered from first the opening toward the first seating surface 48a and a second inner surface region 48e which is radially inwardly tapered from the second opening toward the second seating surface 48b.

Figure 3A:
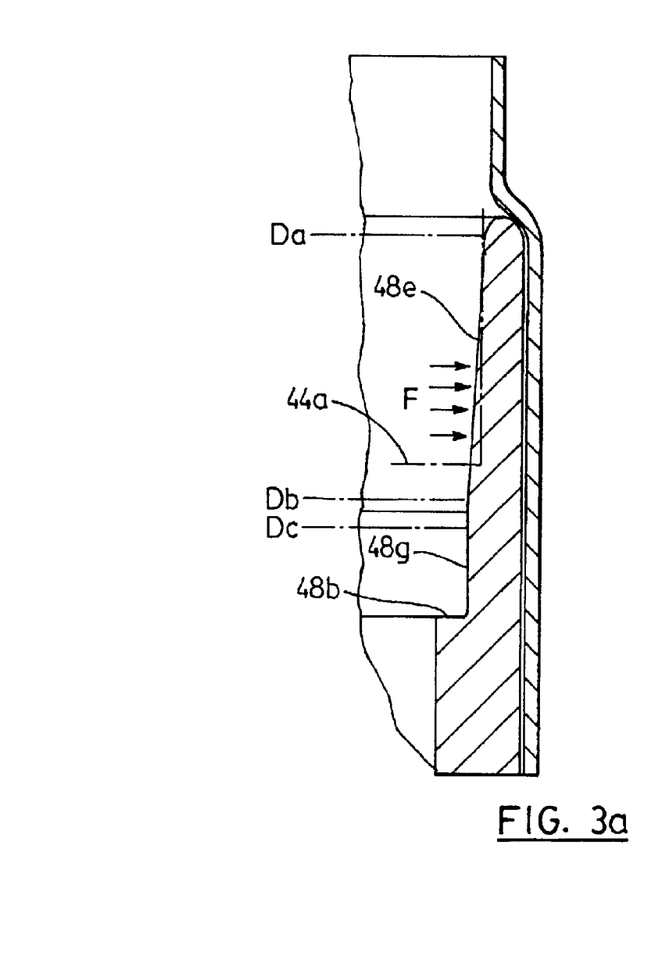
FIG. 3a is a fragmentary sectional view of a portion illustrated in FIG. 3.

In addition, as can be seen in FIGS. 3 and 3a, each of the tapered regions 48d and 48e inwardly terminates at a cylindrically shaped seating collar region 48f, 48g respectively. Each seating collar region 48f, 48g is immediately beside a corresponding seating surface 48a, 48b. The tapering of the tapered regions 48d, 48e is beneficial because it allows the gasket to be transitioned into a tight sealing orientation, as the well casing end 12a and the well casing extension end 44a each are progressed toward their respective full inner positions against the seating surfaces 48a and 48b and with the seating collar region.

The taper occurs between a maximum diameter shown at Da and a minimum diameter shown at Db. These diameters and the profile of the taper between them may be selected as desired. The diameter in the seating collar regions 48f and 48g is shown at Dc and may be, in some cases, approximately the same as diameter Db.

The dimensions Da, Db and Dc as well as the material characteristics of the gasket should be selected so that a suitably tight sealing engagement is achieved between the gasket, the well casing and well casing extension ends and the housing to minimize the unwanted entry of contaminants into the well casing over the operating life of the well installation. It will be understood that other arrangements may also be used to accommodate the expansion of the gasket, such as the use of expansion baffles or cells in the gasket, in the latter case for example by using foamed resilient materials.

The below-ground potable water well installation may be converted to an above-ground installation using the following steps.

a) Access the well chamber 16 and open the upper end 12*a* of the well casing 12.

b) Access the well pump line 18 in the well casing 12 which is connected, by the fluid joint 22, with the water supply line 20 extending into the pump chamber and joined with the well chamber from a neighbouring water delivery location.

c) Disconnect the joint 22 and, if necessary, isolate the well pump line 18.

This step may involve removing the well pump line 18 from the well casing 12. Alternatively, the well pump line 18 may be sealed to prevent contamination, or alternatively may simply be left loose if there is no significant risk of contamination.

d) Provide a coupling member 42 as described above.

e) Prepare the upper end 12*a* of the well casing 12 for engagement with the coupling member 42.

This step may involve grinding or otherwise finishing the upper end 12*a* so that a suitable seal can be established between the upper end 12*a* and the gasket sleeve 48.

f) Orient the first opening 46*a* of the coupling member to a position adjacent the upper end 12*a* and position the housing on the upper end to bring it against the first seating surface 48*a* as shown schematically in FIG. 3.

g) Install a pump line adaptor through the aligned passages 49*a*, 49*b* in the coupling member 42.

h) Install the water supply line to the pump line adaptor.

The adaptor may, for example, be a "pitless" adaptor, as above described, although other adaptors may be equally suitable.

i) Select a well casing extension member of a length which, when added to the predetermined spacing between the seating surfaces in the coupling member, will extend above the ground surface.

j) Orient the lower end of the well casing extension adjacent the second opening and position the lower end in the second opening to bring the lower end against the second seating surface.

k) Fill the well chamber with a suitable filling material around the coupling and the well casing extension member.

l) Install the well pump line to the well pipe adaptor.

Figure 5A:
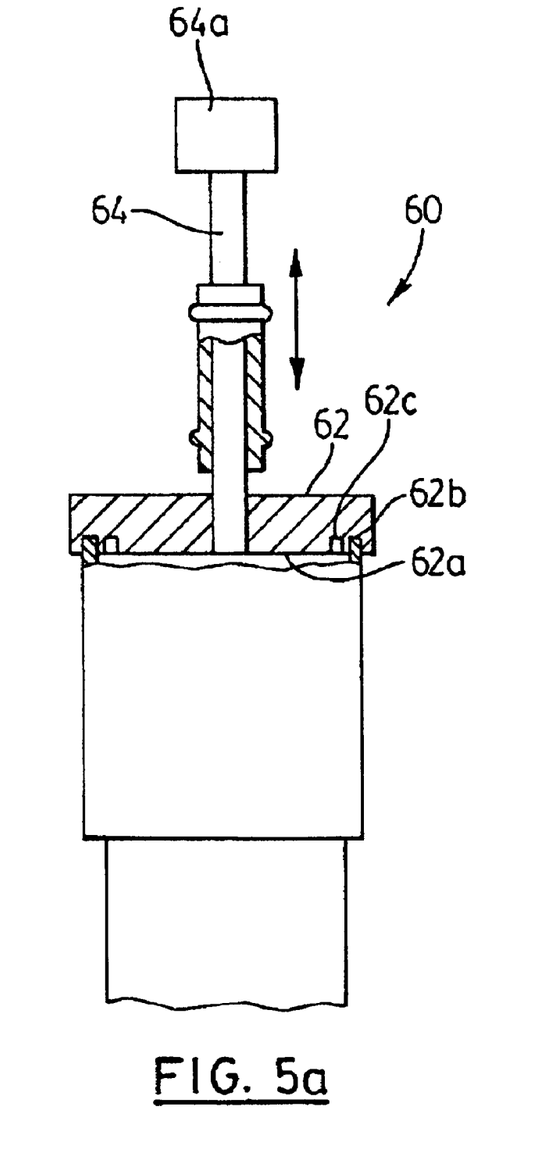
FIGS. 5a and 5b are part-sectional, part fragmentary views of a drive tool associated with the installation of FIG. 4.
Figure 5B:
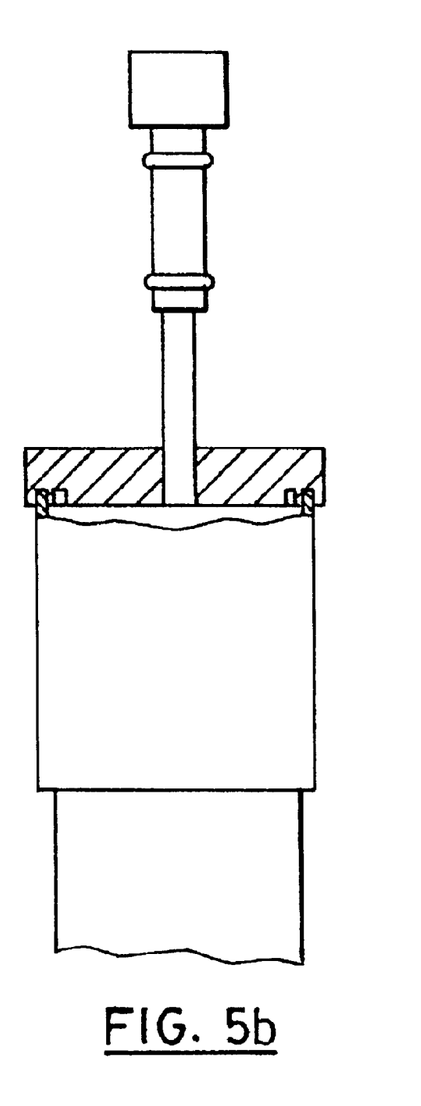

Thus, the installation 10 provides a coupling device which should ease the task of converting below-ground potable well installations to above-ground installations and improve the resulting seal. The coupling device may be installed using a number of techniques. Referring to FIGS. 5 and 5*a*, a driving tool is shown at 60 which is suitable for installing the coupling device. The tool has a base plate 62 having a lower surface 62*a* with a first annular groove 62*b* to match the side wall of the housing 46 at the exposed end 46*b*, as well as a second annular groove 62*c* to match the diameter of the well casing extension. In this manner, the drive tool 60 can be used to drive both the coupling device onto the well casing end 12*a* and thereafter the well casing extension end 44*a* into the coupling device. Located in the central region of the base plate 62 is a passage containing a support rod 64 with a limit block 64*a* at its upper end. Slidably mounted on the support rod is a slide block 66, which is provided with formations 66*a*, 66*b* to aid an installer in locating his hand thereon.

In use, the tool is engaged with the coupling device as shown in FIG. 5*a*. The slide block 66 is then gripped by the installer and is raised and then driven downwardly to impact the base plate and thus to the coupling member. This step can be repeated as many times as necessary to complete the installation of the coupling device, and thereafter the well casing extension. As a result of the downward force, the gasket will be forced downwardly relative to the housing. However, there should be sufficient restraint from both the compressive forces on the gasket between the housing and the well casing end as well as the forces exerted on the gasket by the annular abutment surface 46*d*. It may that, as the well casing end 12*a* just begins to contact the gasket, the majority of its restraint will be provided by the abutment surface 46*d* and then the compressive forces should increase the restraint as the well casing end 12*a* progresses into the gasket. When the well casing extension end is installed in the gasket, the compressive forces of the well casing end-gasket-housing interaction should be sufficient to hold the gasket in place.

There are alternatives to the driving tool 60, as will be understood by those skilled in the art, including alternative driving tools such as a sledge hammer and a suitable block resting on the top surface of the coupling device. Similar techniques can also be used to install the well casing extension in the coupling member.

The coupling device provides an improved seal over that provided by the conventional welded butt-joint between the well casing and the well casing extension. In this case, the seal is provided along the exterior side wall surfaces of both the well casing and the well casing extension. Any obstructions on the end face of the well casing can be ground down so that they do not project into the gasket. If the end of the well casing is uneven, there should be sufficient sealing along the outer surface, that is at the well casing end-gasket-housing interface to maintain an appropriate seal. Furthermore, the seal integrity is not dependent on the long term life of a butt-weld seam performed under difficult conditions, but rather on a coupling member with a robust gasket.

While the gasket in the preferred embodiment is a one piece member, it may instead be formed of several sections. For example, a first gasket element may be used to seal the well casing end and the housing while a second gasket element is provided to seal with the housing and the well casing extension. In this case, a pair of annular supports, such as those shown in dashed lines at 50*a*, 50*b* in FIG. 3 may located in the housing to position the first and second gasket elements. In this case, the central area of the gasket may not be necessary, in some case, provided suitable sealing is provided at the pitless adaptor-housing interface.

The coupling member also simplifies the tools needed for the conversion. The coupling device can conveniently be assembled with the gasket in place and the passages 49*a*, 49*b* properly fabricated before delivery to the well site. The coupling device may also include more than one passage 49 to accommodate other well pipe adaptors. For example, two or more such passages may be appropriate and formed before or after the assembly of the gasket in the housing. Although clearly not as preferable, the passages may, if need be, be formed at the well site or at another site following assembly, provided that proper care is taken to ensure that the passage can be properly sealed.

Figure 6:
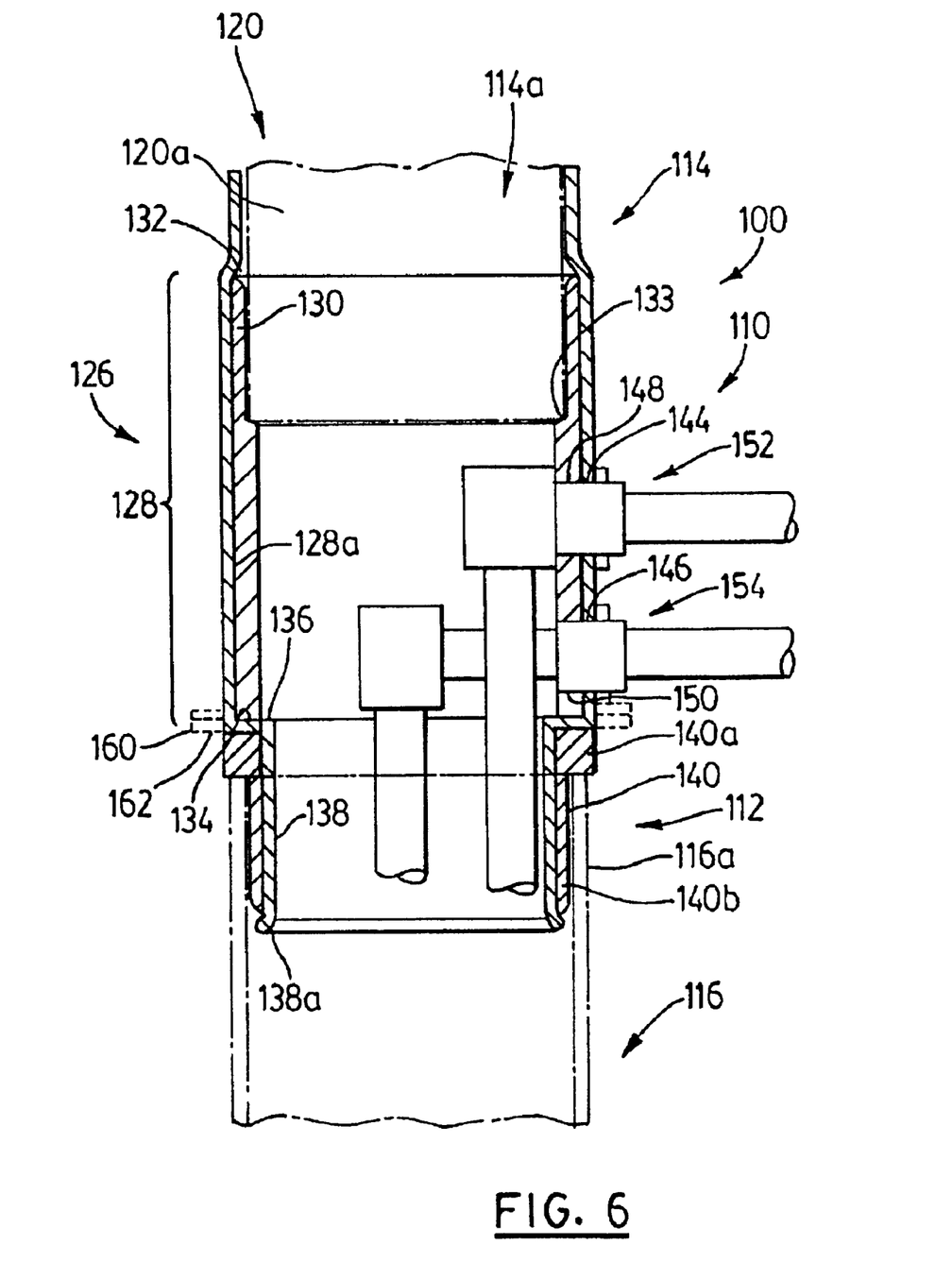
FIG. 6 is a sectional view of an alternative to the portion shown in FIG. 3.

FIG. 6 illustrates another installation 100 in which a coupling device 110 is sealing against the inner surface of a below-ground well casing. The device 110 has a first end 112 region and a second end region 114. The first end region 112 is dimensioned to extend into the upper end 116*a* of a below-ground well casing 116. The second end region 114 is provided with an opening 114a which is dimensioned to receive the lower end 120a of a well casing extension 120.

The device 110 has a housing 126 which is formed from a one piece member which has an expanded central portion 128 to form an internal gasket receiving chamber 128a with a diameter sufficient to accommodate the well casing end and the well casing extension end together with a gasket member 130 there between. In this case, the housing has formations 132, 134 to locate the gasket member 130. As with the earlier embodiment, the gasket member 130 is provided with a seating surface 133 to seat against the lower edge of the well casing extension 120.

In this case, the formation 134 combines with a transition region of the housing to its first end region 112 wherein the housing fits within, rather than outside, the well casing 116. Thus, the transition includes an annular transverse collar 136 which is joined to a cylindrical lower end portion 138. The lower end portion 138 includes a lower annular lip 138a. Extending between the collar 136 and the lip 138a is another gasket member 140. The gasket member 140 includes an expanded upper annular portion 140a which serves to locate the gasket against the collar 136 and provides a seat for the upper end of well casing 116. The gasket also has and a portion 140b which extends along the inner surface of well casing 116.

The housing 126 has a pair of openings 144, 146 which are aligned with similar openings 148, 150 in the gasket member 130 to receiving a pair of pitless adaptors 152, 154, as are typically used for jet pump installations and the like. However, the installation 110 may equally be suited to single pitless adaptor arrangements as discussed for the previous embodiment.

In this embodiment, the housing 126 is formed from a one piece member which has an expanded central portion 128, the annular transverse collar 136 and the cylindrical lower end portion 138. It will be understood that the housing 126 may be formed of more than one member and may be a two piece member, such as for example, by way of anchor flanges 160 extending outwardly from the central region 128 and the collar and fastened together with fasteners on the axis shown at 162. It will also understood that the housing may be further modified to provide both end regions so that they extend inside the well casing and the well casing extension, in a manner similar to the first end region 112 extends into well casing 116.

While the present invention has been described for what are presently considered the preferred embodiments, the invention is not so limited. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The device 10 has a gasket member which is engaged with the outside surface of the upper end 12a and the upper edge of the well casing 12. However, it may be beneficial, in some cases, that the gasket extend at least partially along the inner surface of the upper end 12a. While the device 10 has a housing 46 which is formed from a one piece member which has an expanded central portion to form the gasket receiving chamber 46c, it will be understood that the housing may alternatively be formed of other configurations, such as a two or three piece configuration, the latter case formed by a pair of coaxial pipe sections which are welded to a larger diameter central portion, the latter forming the gasket receiving chamber, for example. In this case, then, the location of the weld between the large central portion and two relatively smaller coaxial pipe sections could be the regions of the housing which provide the annular surfaces 46d, 46e. While the device 10 has a gasket which is provided with tapered regions 48d, 48e, it will be understood that the tapered regions may be provided in other forms, or may be omitted, provided that the gasket's inner surface is configured to allow the upper end of the well casing (as well as the lower end of the well casing extension) to be sealingly engaged therewith.

What is claimed is:

1. A coupling device for converting a below-ground potable water well installation to an above-ground installation, the device comprising;
    a housing having a first end region to engage an upper end of a below-ground well casing and a second end region to engage a lower end of a well casing extension;
    gasket means located adjacent the first and second openings for sealing the respective connections between the housing, the below-ground well casing and the well casing extension; and
    a central region including a passage to receive a well line adaptor therein.

2. A device as defined in claim 1, the gasket means further comprising a first seating surface to seat the upper end of the well casing and a second seating surface to seat the lower end of the well casing extension.

3. A device as defined in claim 1 wherein the first end region includes a first opening which is dimensioned to receive the upper end of the below-ground well casing and the second end region has an opening which is dimensioned to receive the lower end of the well casing extension.

4. A device as defined in claim 3 wherein the gasket means includes a passage which is aligned with the passage in the housing to receive the well line adaptor.

5. A device as defined in claim 3 wherein the gasket means includes a gasket sleeve which extends from a region near the first end to a region near the second end.

6. A device as defined in claim 5 wherein the gasket sleeve is a one piece member.

7. A device as defined in claim 6 wherein the housing includes a gasket receiving region and a plurality of locating formations to locate the gasket sleeve therein.

8. A device as defined in claim 7 wherein the housing includes a gasket receiving chamber of an increased diameter relative to the diameters of the first and second openings.

9. A device as defined in claim 8 wherein the housing is formed from a one piece member.

10. A device as defined in claim 9 wherein the housing has an expanded central portion with a diameter sufficient to accommodate the lower and upper ends together with the gasket member there between, wherein the upper and lower regions of the gasket receiving chamber include annular surfaces which are separated by a distance sufficient for the gasket sleeve to fit there between.

11. A device as defined in claim 1 wherein the first end region is arranged to extend into the upper end of the below-ground well casing and the second end region has an opening which is dimensioned to receive the lower end of the well casing extension.

12. A device as defined in claim 1 wherein the first and second end regions are arranged to extend into both the upper end of the below-ground well casing and the lower end of the well casing extension.

13. A device as defined in claim 6 wherein the gasket means further includes a first inner surface region which is radially inwardly tapered from the first opening toward a first seating surface and a second inner surface region which is radially inwardly tapered from the second opening toward a second seating surface.

14. A device as defined in claim 13, wherein the gasket means further comprises a pair cylindrical seating regions, each of which neighbouring a corresponding seating surface.

15. A device as defined in claim 14, wherein the housing includes an expanded central region adjacent the first and second inner surface regions or the pair of cylindrical seating regions or both.

16. A method as defined in claim 13 wherein a pump is attached to a lower end of the well pump line and step c) includes the step of pulling the well pump line and the pump from the well casing.

17. A method for converting a below-ground potable water well installation to an above-ground installation, the below-ground installation being of the type having a well casing with an upper end positioned below the ground surface and located within a well chamber, comprising the steps of:
   a) accessing the well chamber and opening the upper end of the well casing;
   b) accessing a well pump line in the well casing which is connected, by a fluid joint, with a water supply line extending into the pump chamber from a neighbouring water delivery location;
   c) disconnecting the joint and isolating the well pump line;
   d) providing a coupling member, having:
      a housing having a first opening to receive the upper end and a second opening to receive a lower end of a well casing extension;
      a gasket arrangement for sealing the connection between the housing and the upper end and the connection between the housing and the lower end;
      a first seating surface to seat the upper end and a second seating surface to seat the lower end; and a passage to receive a well line adaptor there between, the seating surfaces between separated by a predetermined spacing;
   e) preparing the upper end for engagement with the coupling member;
   f) orienting the first opening of the coupling member to a position adjacent the upper end and positioning the housing on the upper end to bring the upper end against the first seating surface;
   g) installing a pump line adaptor through a passage formed in the coupling member;
   h) installing the water supply line to the pump line adaptor;
   i) selecting a well casing extension member of a length which, when added to the predetermined spacing between the seating surfaces in the coupling member, will extend above the ground surface;
   j) orienting the lower end of the well casing extension adjacent the second opening and positioning the lower end in the second opening to bring the lower end against the second seating surface;
   k) filling the well chamber with a suitable filling material around the coupling and the well casing extension member; and
   l) installing the well pump line to the well pipe adaptor.

18. A potable water well installation, comprising a below-ground well casing member, an above-ground well casing extension member and a well pipe extension coupler joining them, the coupler having a pair of opposed openings to receive respective adjacent ends of the well casing and well casing extension members, the coupler further comprising a passage and a well pipe adaptor extending through the passage, the adaptor having an upstream end in fluid communication with a down well pump and a downstream end in fluid communication with a water supply pipe.

19. A coupling device for converting a below-ground potable water well installation to an above-ground installation, the device comprising:
   a housing having a pair of openings, one to receive a below-ground well casing and another to receive a lower end of a well casing extension;
   the housing having an outer wall with an expanded central region to provide the central region with a diameter which is larger than the diameters of each of said openings, the central region being bordered by a pair of annular abutments between which is located a one piece gasket sleeve, the gasket sleeve having an inner passage which is coaxial with the pair of openings and which is arranged to seal each end of the well casing end with the well casing extension,
   the inner passage of gasket sleeve having a pair of annular seating surfaces to locate each of the two ends in their fully engaged positions within the gasket sleeve, the annular seating surfaces being separated by a central region, a passage through the gasket in the central region and the outer wall of the housing to receive a well pipe connection adaptor therein,
   the inner passage having pair of tapered portions, each of which is tapered inwardly from each opening toward each seating surfaces and a pair of second non-tapered portions, each of the second non-tapered portions being located between a first portion and a seating surface.

20. A potable well installation comprising:
   a below-ground well casing;
   an above-ground well casing extension; and
   a well pipe extension coupler joining said below-ground well casing and said above-ground well casing extension;
   the coupler including a housing having a first end region configured to engage an upper end of a below-ground well casing and second end region to engage a lower end of a well casing extension;
   gasket means located adjacent the first and second openings for sealing the respective connections between the housing, the below-ground well casing and the well casing extension; and
   a central region including a passage to receive a well line adaptor therein.

21. An installation as defined in claim 20, the gasket means further comprising a first seating surface to seat the upper end of the well casing, and a second seating surface to seat the lower end of the well casing extension.

22. An installation as defined in claim 20, wherein the first end region includes a first opening which is dimensioned to receive the upper end of the below-ground well casing, and wherein the second end region has an opening which is dimensioned to receive the lower end of the well casing extension.

23. An installation as defined in claim 22, wherein the gasket means includes a passage which is aligned with the passage in the housing to receive the well line adaptor.

24. An installation as defined in claim 22, wherein the gasket means includes a gasket sleeve which extends from a region near the first end to a region near the second end.

25. An installation as defined in claim 20, wherein the first end region is arranged to extend into the upper end of the below-ground well casing, and the second end region has an opening which is dimensioned to receive the lower end of the well casing extension.

26. An installation as defined in claim 20, wherein the first and second end regions are arranged to extend into both the upper end of the below-ground well casing and the lower end of the well casing extension.

27. An installation as defined in claim 26, wherein the gasket sleeve is a one piece member.

28. An installation as defined in claim 27, wherein the housing includes a gasket receiving region and a plurality of locating formations to locate the gasket sleeve therein.

29. An installation as defined in claim 28, wherein the housing includes a gasket receiving chamber of an increased diameter relative to the diameters of the first and second openings.

30. An installation as defined in claim 29, wherein the housing is formed from a one piece member.

31. An installation as defined in claim 30, wherein the housing has an expanded central portion with a diameter sufficient to accommodate the lower and upper ends together with the gasket member there between, wherein the upper and lower regions of the gasket receiving chamber include annular surfaces which are separated by a distance sufficient for the gasket sleeve to fit there between.

32. An installation as defined in claim 28, wherein the gasket means further includes a first inner surface region which is radially inwardly tapered from the first opening toward a first seating surface and a second inner surface region which is radially inwardly tapered from the second opening toward a second seating surface.

33. An installation as defined in claim 32, wherein the gasket means further comprises a pair cylindrical seating regions, each of which neighbouring a corresponding seating surface.

34. An installation as defined in claim 33, wherein the housing includes an expanded central region expansion surface regions are adjacent the first and second inner regions or the pair of cylindrical seating regions or both.

* * * * *